United States Patent
Kotani et al.

(10) Patent No.: US 9,997,274 B2
(45) Date of Patent: Jun. 12, 2018

(54) INSULATING THERMALLY CONDUCTIVE RESIN COMPOSITION

(71) Applicant: Panasonic Intellectual Property Management Co., Ltd., Osaka (JP)

(72) Inventors: Yuki Kotani, Osaka (JP); Hiroyoshi Yoden, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/310,152

(22) PCT Filed: Apr. 22, 2015

(86) PCT No.: PCT/JP2015/002187
§ 371 (c)(1),
(2) Date: Nov. 10, 2016

(87) PCT Pub. No.: WO2015/174023
PCT Pub. Date: Nov. 19, 2015

(65) Prior Publication Data
US 2017/0154705 A1   Jun. 1, 2017

(30) Foreign Application Priority Data

May 15, 2014   (JP) ................................. 2014-101032

(51) Int. Cl.
*H01B 3/40* (2006.01)
*C09K 5/14* (2006.01)
*C08L 63/00* (2006.01)

(52) U.S. Cl.
CPC ............... *H01B 3/40* (2013.01); *C08L 63/00* (2013.01); *C09K 5/14* (2013.01); *C08L 2203/206* (2013.01); *C08L 2205/03* (2013.01); *C08L 2205/12* (2013.01)

(58) Field of Classification Search
CPC ....... H01B 3/40; C08L 63/00; C08L 2205/12; C08L 2205/03; C08L 2203/206; C09K 5/14
See application file for complete search history.

(56) References Cited

U.S. PATENT DOCUMENTS 6,352,019 B1   3/2002   Hasegawa et al.
2004/0204526 A1   10/2004   Matsukawa et al.

FOREIGN PATENT DOCUMENTS

| EP | 2 980 161 A1 | 2/2016 | |
|---|---|---|---|
| JP | H11-323162 A | 11/1999 | |
| JP | 2000-022289 A | 1/2000 | |
| JP | 2000-46008 A | 2/2000 | |
| JP | 2000-251598 A | 9/2000 | |
| JP | 2006-328155 A | 12/2006 | |
| JP | 2008-169265 A | 7/2008 | |
| JP | 2009-036930 A | 2/2009 | |
| JP | 2010-065064 A | 3/2010 | |
| JP | 2010-132838 A | 6/2010 | |
| JP | 2012-122057 A * | 6/2012 | ............... C08K 3/22 |
| JP | 4996182 B2 | 8/2012 | |
| JP | 2012-244850 A | 12/2012 | |
| JP | 2012-255086 A | 12/2012 | |
| JP | 2013-227455 A | 11/2013 | |
| JP | 2013-256588 A | 12/2013 | |
| WO | WO 03/029352 A1 | 4/2003 | |
| WO | WO 2014/155975 A1 | 10/2014 | |

OTHER PUBLICATIONS

Extended European Search Report dated Apr. 7, 2017 for corresponding European Application No. 15792988.6.
XP002768555 Database WPI Week 201467 Thomson Scientific, London, GB; AN 2014-S07554.
International Search Report for corresponding International Application No. PCT/JP2015/002187 dated Jul. 28, 2015.
Form PCT/ISA/237 for corresponding International Application No. PCT/JP2015/002187 dated Jul. 28, 2015.

* cited by examiner

*Primary Examiner* — Robert Harlan
(74) *Attorney, Agent, or Firm* — Renner, Otto, Boisselle & Sklar, LLP (57) ABSTRACT

An insulating thermally conductive resin composition (10) includes a matrix resin (1) and insulators (2). The insulators (2) are dispersed in the matrix resin and have electrical insulation. The insulating thermally conductive resin composition further includes a thermally conductive phase (3) which has a hither thermal conductivity than the matrix resin and thermally connects the insulators with each other. The thermally conductive phase (3) is composed of an organic substance. The thermally conductive phase that thermally connects the insulators is composed of the organic substance, so that the resultant insulating thermally conductive resin composition has electrical insulation while having improved thermal conductivity.

6 Claims, 3 Drawing Sheets

INSULATING THERMALLY CONDUCTIVE RESIN COMPOSITION

TECHNICAL FIELD

The present invention relates to an insulating thermally conductive resin composition. More specifically, the present invention relates to an insulating thermally conductive resin composition used in thermally conductive components that cool electronic components and the like, such as radiators, for example.

BACKGROUND ART

Semiconductors, such as computers (central processing units: CPUs), transistors, and light emitting diodes (LEDs) in use generate heat. The generated heat could sometimes reduce the performance of electronic components. Such electronic components that generate heat are typically provided with radiators.

Conventional radiators are made of metal with high thermal conductivity. In recent years, more radiators are made of insulating thermally conductive resin compositions which have high flexibility in shape and facilitate reduction in weight and size of radiators. Such an insulating thermally conductive resin composition needs to contain a large amount of thermally conductive inorganic fillers in binder resin in order to increase in thermal conductivity. However, it is known that just increasing the content of the thermally conductive inorganic fillers causes various problems. For example, if the content of the thermally conductive inorganic fillers is just increased, the viscosity of the resultant resin composition not yet cured increases to significantly reduce formability and workability, causing molding failure. Moreover, the amount of inorganic fillers that can be blended is limited, and the resultant resin composition has insufficient thermal conduction in many cases.

There is a disclosed method to increase the thermal conductivity by forming a bicontinuous phase-separated structure using plural resins and localizing thermally conductive particles in one of the resin phases (see Patent Literature 1, for example).

Moreover, another highly thermally conductive resin composition is disclosed, in which thermally conductive fillers are dispersed in matrix resin and are connected with a low-melting point alloy (see Patent Literature 2, for example). Still another insulating thermally conductive resin composition is disclosed, which includes thermoplastic resin, magnesium oxide, metallic powder having a melting point of 500° C. or higher, and a low-melting point alloy having a melting point of 500° C. or lower (see Patent Literature 3, for example). A highly thermally conductive polymer nanocomposite material is disclosed, in which thermally conductive fillers supporting metallic nano-particles having a melting point of 240° C. or higher are dispersed in a resin composition (see Patent Literature 4, for example).

Moreover, a highly thermally conductive resin composition is disclosed which includes thermoplastic resin, a highly thermally conductive inorganic compound, and low-melting point glass (see Patent Literature 5, for example).

CITATION LIST

Patent Literature

Patent Literature 1: Japanese Unexamined Patent Application Publication No. 2010-65064

Patent Literature 2: WO2003/029352
Patent Literature 3: Japanese Unexamined Patent Application Publication No. 2006-328155
Patent Literature 4: Japanese Patent No. 4996182
Patent Literature 5: Japanese Unexamined Patent Application Publication No. 2008-169265

SUMMARY OF INVENTION

However, if the thermally conductive fillers are unevenly distributed as disclosed in Patent Literature 1, it is difficult to form continuous thermal conduction paths. Moreover, some of the thermal conduction paths are divided by the resin phase in some cases, resulting in insufficient thermal conduction. Moreover, when metal is used to improve the thermal conduction as disclosed in Patent Literatures 2 to 4, the electrical insulation of the resultant resin composition is reduced.

In the case of using a low-melting point metal as disclosed in Patent Literatures 2 and 3, it is necessary to heat the materials to such a temperature that the low-melting point metal is semi-molten. Similarly, in the case of using low-melting point glass as disclosed in Patent Literature 5, it is necessary to perform molding at a temperature equal to or higher than the softening point of the low-melting point glass. The resin for use therefore needs to have high-temperature durability, and the types thereof are limited.

The present invention was made in the light of the problems involved in the conventional arts. An object of the present invention is to provide an insulating thermally conductive resin composition having high thermal conductivity and providing excellent electrical insulation.

To solve the aforementioned problem, an insulating thermally conductive resin composition according to an aspect of the present invention includes: a matrix resin; and insulators which are dispersed in the matrix resin and have electrical insulation. The insulating thermally conductive resin composition includes a thermally conductive phase which has a higher thermal conductivity than the matrix resin, thermally connects the insulators, and is composed of an organic substance.

DESCRIPTION OF EMBODIMENTS

Hereinafter, a description is given of insulating thermally conductive resin compositions according to embodiments of the present invention in detail. Some dimensional proportions in the drawings are exaggerated for convenience of explanation and are different from actual ones.

[First Embodiment]

Figure 1:
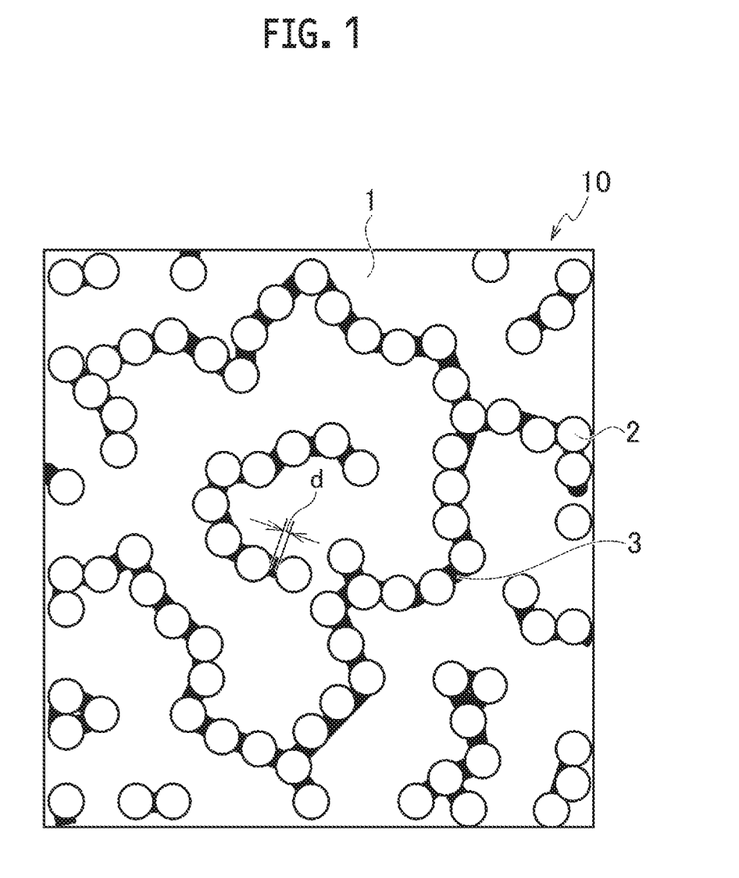
FIG. 1 is a schematic view illustrating an insulating thermally conductive resin composition according to a first embodiment of the present invention.

As illustrated in FIG. 1, an insulating thermally conductive resin composition 10 according to a first embodiment includes a matrix resin 1 and insulators 2 which are dispersed in the matrix resin 1 and have electrical insulation. The insulating thermally conductive resin composition 10 further includes a thermally conductive phase 3, which is composed of an organic substance. The thermally conductive phase 3 has a higher thermal conductivity than the matrix resin 1 and thermally connects the insulators 2.

In the insulating thermally conductive resin composition 10 of the first embodiment, the insulators 2 as filler, which have high thermal conduction, are dispersed within the matrix resin 1. Since the insulators 2 form thermal conduction paths, the entire resin composition has a higher thermal conductivity than resin composition composed of only the matrix resin 1. However, if the insulators 2 are dispersed within the matrix resin 1 just by kneading the matrix resin 1 and the insulators 2, the surfaces of the insulators 2 are covered with the matrix resin 1, which has low thermal conduction, and the resultant resin composition has insufficient thermal conduction. In other words, the surfaces of the insulators are covered with low thermally conductive resin, which inhibits thermal conduction between the insulators. The resultant resin composition therefore has insufficient thermal conduction.

To improve the thermal conduction, there is a method of localizing insulators in one of resin phases in the phase-separated structure to make the inter-insulator distance smaller than that in the absence of phase separation. This method can be expected to increase contacts between the insulators and improve the thermal conduction. However, the resin having low thermal conduction is still laid between the insulators and serves as heat resistance. The resultant resin composition therefore does not provide a sufficient thermal conduction effect.

The insulating thermally conductive resin composition 10 of the first embodiment is provided with the thermally conductive phase between the insulators 2 adjacent to each other, the thermally conductive phase having a higher thermal conductivity than the matrix resin 1 and thermally connects the insulators 2. When the thermally conductive phase 3 is provided between particles of the insulators 2 having thermal conductivity, the insulators 2 are thermally connected as illustrated in FIG. 1. This forms thermal conduction paths which are composed of the insulators 2 and thermally conductive phase 3 and transfer heat energy, within the insulating thermally conductive resin composition 10. The insulating thermally conductive resin composition 10 therefore includes more routes to conduct heat and has higher thermal conduction.

Herein, when the insulators 2 are linked with a low-melting point alloy as disclosed in Patent Literature 2, the resultant resin composition has lower electrical insulation, which can cause short-circuits within electronic components. In the first embodiment, the thermally conductive phase 3 is made of an organic substance in order to ensure electrical insulation between the insulators 2. Accordingly, even when the insulating thermally conductive resin composition 10 is used in an electronic component, sufficient electrical insulation thereof can prevent internal short-circuit.

In the case of linking the insulators 2 with a low-melting point alloy, it is necessary to heat the materials to a temperature at which the low-melting point metal is semi-molten. The matrix resin requires high-temperature durability, and resins usable as the matrix resin are limited. In the first embodiment, the insulators 2 are connected with an organic substance having high thermal conduction, and the matrix resin can be composed of resin having low high-temperature durability. This can increase the number of applicable types of resin.

In the insulating thermally conductive resin composition 10 of the first embodiment, the average distance between adjacent insulators 2 in the matrix resin 1 is preferably smaller than the average particle diameter of the insulators 2. In other words, the thickness of the thermally conductive phase between the insulators 2 is preferably smaller than the average particle diameter of the insulators 2. When the average distance between adjacent insulators 2 in the matrix resin 1 is smaller than the average particle diameter of the insulators 2, the insulators 2 are located close to each other, and the thermal resistance between the insulators 2 is further reduced. The resin composition 10 therefore has improved thermal conduction.

Distance d between the insulators 2 refers to the shortest distance between the surfaces of the adjacent insulators 2. The average distance between adjacent insulators 2 can be obtained by observing a cross-section of the insulating thermally conductive resin composition 10 using a scanning electronic microscope (SEM). The average particle diameter of the insulators 2 included in the insulating thermally conductive resin composition 10 can be measured by baking the insulating thermally conductive resin composition 10 to isolate the insulators 2. In this description, the "average particle diameter" stands for a median diameter. Moreover, the median diameter stands for a particle diameter (d50) in which an integrated (accumulated) weight percent becomes 50%. For example, the median diameter can be measured by using the laser diffraction-type particle size distribution measuring instrument "SALD2000" (made by Shimadzu Corporation).

In the insulating thermally conductive resin composition 10 of the first embodiment, it is preferable that the thermally conductive phase 3 is provided in contact with both of insulators 2 adjacent to each other. The thermally conductive phase at least needs to be situated so as to thermally connect the insulators 2 but may be situated so as to cover the surfaces of the insulators 2.

In the insulating thermally conductive resin composition 10, adjacent insulators 2 may be in contact. The thermally conductive phase 3 may be situated around the contact surfaces between the adjacent insulators 2. This configuration enables thermal conduction through both the contact surfaces of the insulators 2 and thermally conductive phase 3, so that the insulating thermally conductive resin composition 10 has further improved thermal conduction.

The insulating thermally conductive resin composition 10 is preferably mainly composed of the matrix resin 1 and the insulators 2. Specifically, the total content of the matrix resin 1 and the insulators 2 in the insulating thermally conductive resin composition 10 is preferably 50% by mass or more, more preferably 70% by mass or more, and especially preferably 90% by mass or more. When the insulating thermally conductive resin composition 10 is mainly composed of the matrix resin 1 and the insulators 2, the resultant resin composition is excellent in formability, thermal conduction, and strength.

<Matrix Resin>

In the insulating thermally conductive resin composition 10 of the first embodiment, the resin material constituting the matrix resin 1 is not particularly limited as long as the insulators 2 can be dispersed within the matrix resin 1 and the thermally conductive phase 3 can be formed between the insulators 2. Preferably, the matrix resin 1 is at least any one of thermosetting resin and thermoplastic resin, for example.

The thermosetting resin can be at least one selected from the group consisting of epoxy resin, unsaturated polyester resin, vinyl ester resin, phenol resin, urethane resin, urea resin, melamine resin, maleimide resin, cyanate ester resin, alkyd resin, and addition-curable polyimide resin, for example. Among these resins, epoxy resin is preferred because of the excellent heat resistance, electrical insulation, and mechanical properties thereof.

In the case of using epoxy resin as the thermosetting resin, publicly known resins can be used. Examples of epoxy resin include bisphenol A-type epoxy resin, bisphenol F-type epoxy resin, bisphenol S-type epoxy resin, biphenyl-type epoxy resin, naphthalene diol-type epoxy resin, and phenol novolac-type epoxy resin. Examples of epoxy resin also include cresol novolac-type epoxy resin, bisphenol A novolac-type epoxy resin, cycloaliphatic epoxy resin and heterocyclic epoxy resin (triglycidyl isocyanurate, diglycidyl hydantoin and the like). Moreover, examples of the thermosetting resin can be modified epoxy resins which are obtained by modifying the above epoxy resins with various materials. Furthermore, examples of the thermosetting resin can be halides such as bromides or chlorides of the above epoxy resins. The above-described epoxy resins can be used alone or in combination.

The curing agent to cure epoxy resin can be any compound including an active group that reacts with an epoxy group. The curing agent can be properly selected from publicly known epoxy curing agents. The curing agent is suitably a compound including an amino group, an acid anhydride group, or a hydroxy phenyl group in particular. Examples of the epoxy curing agent include dicyandiamide, derivatives thereof, organic acid hydrazide, amine imide, aliphatic amine, aromatic amine, tertiary amine, polyamine salts, microcapsule-type curing agents, imidazole-type curing agents, acid anhydrides, and phenol novolac. The above-described curing agents can be used alone or in combination.

Moreover, various types of curing promotors can be used together with the aforementioned curing agents. When the thermosetting resin is epoxy resin, for example, the curing promotor can be a tertiary amine-based curing promotor, a urea derivative-based curing promotor, an imidazole-based curing promotor, or a diazabicycloundecene (DBU)-based curing promotor. The curing promotor also can be an organic phosphor-based curing promotor (for example, a phosphine-based curing promotor and the like), or an onium salt-based curing promotor (for example, a phosphonium salt-based curing promotor, a sulfonium salt-based curing promotor, an ammonium salt-based curing promotor and the like). The curing promotor can be a metal chelate-based curing promotor or an acid or metal salt-based curing promotor, for example.

In the thermoplastic resin, generally, the principal chain includes at least one bond selected from the group consisting of a carbon-carbon bond, an amide bond, an imide bond, an ester bond, and an ether bond. The principal chain of the thermoplastic resin includes at least one bond selected from the group consisting of a carbonate bond, an urethane bond, an urea bond, a thioether bond, a sulfone bond, an imidazole bond, and a carbonyl bond.

The thermoplastic resin can be selected from the group consisting of a polyolefin-based resin; a polyamide-based resin; an elastomer-based (styrene-based, olefin-based, polyvinyl chloride (PVC)-based, urethane-based, ester-based, and amide-based) resin; an acrylic resin; a polyester-based resin; engineering plastics; polyethylene; polypropylene; a Nylon resin; an acrylonitrile-butadiene-styrene (ABS) resin; an acrylic resin; an ethylene acrylate resin; an ethylene vinyl acetate resin; and a polystyrene resin; a polyphenylene sulfide resin; a polycarbonate resin; a polyester elastomer resin; a polyamide elastomer resin; a liquid crystal polymer; and a polybutylene terephthalate resin.

From the viewpoint of heat resistance, the thermoplastic resin is preferably engineering plastic such as polyether sulfone, polysulfone, polyimide, or polyetherimide. More preferably, the thermoplastic resin is polyether sulfone, which is excellent in various terms including mechanical properties, electrical insulation, and solubility with solvent.

The thermoplastic resin as described above may include a functional group which reacts with the epoxy resin. The function group can be an amino group, a hydroxyl group, a chlorine atom, and an alkoxy group.

<Insulator>

The insulating thermally conductive resin composition 10 of the first embodiment can provide a resin composition having electric insulating properties by using an electrical insulating material. In the insulating thermally conductive resin composition 10, the constituent material of the insulators 2 is preferably an inorganic compound provided with thermal conductivity and electric insulating properties.

The inorganic compound provided with thermal conduction can be an inorganic compound having a thermal conductivity of not less than 1 W/(m·K), for example. The thermal conductivity of the inorganic compound with thermal conduction is preferably not less than 10 W/(m·K) and more preferably not less than 30 W/(m·K). The inorganic compound provided with electric insulating properties can be an inorganic compound having a volume resistivity of not less than 10 Ω·cm at room temperature (25° C.). The volume resistivity of the inorganic compound having electric insulating properties is preferably not less than $10^5$ Ω·cm, more preferably not less than $10^8$ Ω·cm, and especially preferably not less than $10^{13}$ Ω·cm.

Examples of the inorganic compound with thermal conduction and electric insulating properties are boride, carbides, nitrides, oxides, silicides, hydroxides, and carbonates. Specifically, the insulators 2 can include at least one selected from the group consisting of magnesium oxide (MgO), aluminum oxide ($Al_2O_3$), boron nitride (BN), aluminum nitride (AlN), aluminum hydroxide ($Al(OH)_3$), silicon dioxide ($SiO_2$), magnesium carbonate ($MgCO_3$), magnesium hydroxide ($Mg(OH)_2$), calcium carbonate ($CaCO_3$), clay, talc, mica, titanium oxide ($TiO_2$), and zinc oxide (ZnO). From the viewpoint of the thermal conduction and easy filling, the insulators 2 preferably contain at least one selected from the group consisting of MgO, $Al_2O_3$, BN, and AlN. The insulators 2 especially preferably contain at least one selected from the group consisting of MgO, $Al_2O_3$, and BN. Moreover, the insulators 2 may be particles composed of at least one selected from the group consisting of magnesium oxide (MgO), aluminum oxide ($Al_2O_3$), boron nitride (BN), aluminum nitride (AlN), aluminum hydroxide ($Al(OH)_3$), silicon dioxide ($SiO_2$), magnesium carbonate ($MgCO_3$), magnesium hydroxide ($Mg(OH)_2$), calcium carbonate ($CaCO_3$), clay, talc, mica, titanium oxide ($TiO_2$), and zinc oxide (ZnO).

In the insulating thermally conductive resin composition 10, the insulators 2 preferably have an average particle diameter of 0.5 μm to 50 μm. When the average particle diameter is in this range, the insulators 2 are more likely to be highly dispersed in the matrix resin 1. Moreover, as described later, when the matrix resin 1 has a phase-separated structure, the insulators 2 are more likely to be unevenly distributed in the continuous phase of the phase-separated structure. The insulating thermally conductive resin composition has good workability and formability. Specifically, by the fact that the average particle diameter is 0.5 µm or more, the viscosity of the resin can be suppressed from being excessively increased. The resin therefore ensures fluidity and has good workability and formability. Moreover, when the average particle diameter is 50 µm or less, the insulators 2 are more likely to be unevenly distributed in the first resin phase 1A, and thermal conduction paths are formed, thus implementing high thermal conduction. The average particle diameter of the insulators 2 is preferably 0.5 µm to 20 µm and more preferably 1 µm to 10 µm.

The shape of the insulators 2 is not particularly limited. The insulators 2 may be spherical or polyhedral, for example. The insulators 2 may have a thin plate shape, such as scales, thin leaves, and flakes. Preferably, the insulators 2 are spherical. When the insulators 2 have such a shape, the insulators 2 are more likely to be highly dispersed in the matrix resin 1. When the matrix resin 1 has a phase-separated structure, the insulators 2 having such a shape are more likely to be unevenly distributed in the continuous phase of the phase-separated structure.

In the first embodiment, the proportion of the insulators 2 in the insulating thermally conductive resin composition 10 (volume of the insulators/volume of the insulating thermally conductive resin composition) is preferably 10 to 80% by volume. When the volume proportion of the insulators 2 is not less than 10% by volume, contacts between the insulators 2 are expected to implement the sufficient effect on increasing thermal conduction in addition to the thermally conductive phase 3 between the insulators 2. When the volume proportion of the insulators 2 is not more than 80% by volume, it is possible to prevent the resin from having excessively high viscosity at molding. The volume proportion can be measured by a method described later.

The proportion of the insulators 2 in the insulating thermally conductive resin composition 10 is more preferably 15 to 80% by volume, still more preferably 20 to 80% by volume, especially preferably 30 to 70% by volume, and most preferably 30 to 60% by volume. The proportion of the insulators 2 being in the above range implements high thermal conductivity and formability.

The insulators 2 may be subjected to surface treatment such as coupling to improve in compatibility and adherence with the resin or may be added with a dispersant to improve in dispersion in the insulating thermally conductive resin composition 10. By properly selecting a surface treatment agent, the insulators 2 can be more effectively unevenly distributed in the phase-separated structure.

For the surface treatment, an organic surface treatment agent such as fatty acid, fatty acid ester, higher alcohol and hydrogenated oil can be used. Moreover, for the surface treatment, an inorganic surface treatment agent such as silicone oil, a silane coupling agent, an alkoxysilane compound and a silylation agent can also be used. By using these surface treatment agents, water resistance of the insulating thermally conductive resin composition is sometimes enhanced, and further, the dispersibility thereof into the resin is sometimes enhanced. A treatment method is not particularly limited; however, there are (1) a dry method, (2) a wet method, (3) an integral blending method and the like.

(1) Dry Method

The dry method is a method of performing the surface treatment by dropping the surface treatment agent onto the insulators while stirring the insulators by mechanical stirring using the Henschel mixer, the nauta mixer, the vibration mill and the like. In a case of using silane as the surface treatment agent, there can be used: a solution obtained by diluting silane with an alcohol solvent; a solution obtained by diluting silane with the alcohol solvent and further adding water thereto; a solution obtained by diluting silane with the alcohol solvent and further adding water and acid thereto and the like. A preparation method of the surface treatment agent is written on a catalog and the like of each maker of the silane coupling agent; however, the preparation method is appropriately determined depending on a hydrolysis rate of silane and a type of the insulator.

(2) Wet Method

The wet method is a method of immersing the insulators directly into the surface treatment agent. A usable surface treatment agent is similar to the above-described drying method. Moreover, a preparation method of the surface treatment agent is also similar to that in the dry method.

(3) Integral Blending Method

The integral blending method is a method of, at a time of mixing a resin and filler with each other, directly adding the surface treatment agent as it is into a mixer or after diluting the same surface treatment agent with alcohol and the like, followed by stirring. A preparation method of the surface treatment agent is similar to those of the dry method and the wet method; however, it is general to increase an amount of the surface treatment agent in a case of performing the surface treatment by the integral blending method in comparison with those of the dry method and the wet method.

In the dry method and the wet method, the surface treatment agent is dried according to needs. In a case of adding such a surface treatment agent using alcohol and the like, it is necessary to volatilize alcohol. If alcohol remains finally in a blended compound, then alcohol is generated as gas, and adversely affects a polymer content. Hence, it is preferable to set a drying temperature at a boiling point of a used solvent or more. Moreover, in the case of using silane as the surface treatment agent, then it is preferable to heat such a blended compound to a high temperature (for example, 100° C. to 150° C.) by using a device in order to rapidly remove silane that has not reacted with the insulators. However, it is preferable to maintain the blended compound at a temperature lower than the decomposition point of silane also in consideration of heat resistance of silane. It is preferable that a treatment temperature approximately range from 80 to 150° C., and that a treatment time range from 0.5 to 4 hours. The drying temperature and the time are appropriately selected depending on a throughput, whereby it becomes possible to remove the solvent and the unreacted silane.

In the case of using silane as the surface treatment agent, an amount of silane, which is required to treat the surface of the insulators, can be calculated by the following expression.

[Amount of silane (g)]=[amount of insulators (g)]× [specific surface area of insulators ($m^2$/g)]/ [minimum coating area of silane ($m^2$/g)]

The "minimum coating area of silane" can be obtained by the following calculation expression.

[Minimum coating area of silane ($m^2$/g)]=($6.02 \times 10^{23}$)×($13 \times 10^{-20}$ ($m^2$))/[molecular weight of silane]

In the expression, "$6.02 \times 10^{23}$" is the Avogadro constant, and "$13 \times 10^{-20}$" is an area (0.13 $nm^2$) covered by one-molecule silane.

It is preferable that the required amount of silane be 0.5 time or more to less than 1.0 time the amount of silane, which is calculated by this calculation expression. Even if the amount of silane is 1.0 time or more, the effects of the present embodiment can be exerted. However, in such a case where the amount of silane is 1.0 time or more, an unreacted content remains, causing an apprehension that a decrease of mechanical properties and a decrease of physical properties, such as a decrease of water resistance, may be brought about, and accordingly, it is preferable that an upper limit of the required amount of silane be less than 1.0 time. Moreover, a reason why a lower limit value of the required amount of silane is set at 0.5 time the amount of silane, which is calculated by the above-described calculation expression, is that this lower limit value is sufficient for effectively enhancing a filling capability of the filler into the resin.

<Thermal Conductive Phase>

In the insulating thermally conductive resin composition 10 of the first embodiment, the thermally conductive phase 3 thermally connects the insulators 2. The thermally conductive phase 3 is in contact with two adjacent insulators 2 to perform thermal conduction between the two insulators 2. The insulating thermally conductive resin composition 10 needs to have high electrical insulation. The thermally conductive phase 3 is therefore composed of an organic substance.

The highly thermally conductive organic substance included in the thermally conductive phase 3 is not particularly limited but needs to be such a compound that the thermal conduction (thermal conductivity) of the thermally conductive phase 3 is higher than that of the matrix resin 1. The organic substance constituting the thermally conductive phase 3 is a liquid crystal resin obtained by polymerization of a resin composition including a monomer having a mesogenic group (described in Japanese Unexamined Patent Application Publication No. H11-323162), for example. Moreover, the organic substance can be a liquid crystal polyester described in Japanese Unexamined Patent Application Publications No. 2013-227455 and No. 2013-256588. These liquid crystal resins provide electrical insulation and have a thermal conductivity of not less than 0.4 W/(m·K), implementing effective thermal conduction between the insulators 2.

Examples of the organic substance constituting the thermally conductive phase 3 include ethylene propylene diene monomer rubber (EPDM) expressed by Chemical Formula 1. Herein, the third component X constituting a principal chain of Chemical Formula 1 is dicyclopentadiene or 1,4-hexadiene, for example. In an example of ethylene propylene diene monomer rubber expressed by Chemical Formula 2, the third component X is ethylidene norbornene. The aforementioned EPDMs also provide electrical insulation and have a thermal conductivity of not less than 0.3 W/(m·K), enabling effective thermal conduction between the insulators 2. The EPDM expressed by Chemical Formula 2 has a thermal conductivity of 0.36 W/(m·K).

Moreover, the organic substance constituting the thermally conductive phase 3 can be polysulfide rubber (—(R-Sx)-) having a thermal conductivity of 0.3 W/(m·K), for example. The organic substance constituting the thermally conductive phase 3 is not limited to the aforementioned substances and can be epoxy resin having high thermal conduction, for example. The organic substance constituting the thermally conductive phase 3 can be one selected from the aforementioned substances or a combination of two or more thereof.

The organic substance constituting the thermally conductive phase 3 preferably has a thermal conductivity of not less than 0.3 W/(m·K) and especially preferably has a thermal conductivity of not less than 0.4 W/(m·K). When the thermal conductivity is not less than 0.3 W/(m·K), the thermally conductive phase 3 effectively conducts heat between insulators 2, thus improving the thermal conduction in the whole insulating thermally conductive resin composition 10.

The thermally conductive phase 3 is preferably mainly composed of the organic substance described above. Specifically, the content of the organic substance in the thermally conductive phase 3 is preferably not less than 50% by mole, more preferably not less than 70% by mole, and especially preferably not less than 90% by mole.

<Additive>

The insulating thermally conductive resin composition 10 may include colorants, flame retarders, flame-retardant assistants, fiber reinforcements, viscosity reducers for viscosity adjustment in production, dispersion adjusters for improving dispersion of toner (colorant), mold release agents, and the like to such a degree that do not inhibit the effects of the first embodiment. These additives can be publicly-known agents, and examples thereof are shown below.

The colorants can be inorganic pigments such as titanium oxide, organic pigments, or toners mainly composed of the inorganic or organic pigments, for example. These colorants can be used alone or in combination.

The flame retarders are organic flame retarders, inorganic flame retarders, reactive flame retarders, and the like. These flame retarders can be used alone or in combination. When a flame retarder is included in the insulating thermally conductive resin composition 10, it is preferred to use a flame-retardant assistant together. Such flame-retardant assistants include antimony compounds such as antimony trioxide, diantimony tetraoxide, diantimony pentoxide, sodium antimonate, and antimony tartrate, zinc borate, barium metaborate, hydrated alumina, zirconium oxide, ammonium polyphosphate, tin oxide, iron oxide, and the like. These flame-retardant assistants can be used alone or in combination.

<Method of Manufacturing Insulating Thermally Conductive Resin Composition>

Next, a description is given of a method of manufacturing the insulating thermally conductive resin composition of the first embodiment. In the manufacturing method of the first embodiment, the thermally conductive phase 3 is formed around the insulators 2. Specifically, the insulators 2 and the organic substance constituting the thermally conductive phase 3 are mixed to bring the organic substance into contact with the surfaces of the insulators 2. In this process, the organic substance may be brought into contact with the surfaces of the insulators 2 by mixing the insulators and organic substance using a solvent into a slurry and then removing the solvent from the slurry.

The solvent can be an organic solvent capable of dissolving the organic substance, for example. Examples of the

[Chem. 1]

[Chem. 2]

organic solvent, which is not particularly limited, are aromatic hydrocarbons (toluene, xylene, etc.), alcohols (methanol, ethanol, isopropyl alcohol, etc.), and ketones (acetone, methyl ethyl ketone, methyl isobutyl ketone, etc.). Other examples are aliphatic hydrocarbons (hexane, heptane, etc.), ethers (tetrahydrofuran, etc.). These organic solvents can be used alone or in combination.

Next, the insulators 2 including the organic substance are kneaded with the matrix resin, thus preparing an uncured resin composition. In the case of using a thermosetting resin as the matrix resin, a curing agent and a curing promotor are added when needed. The components may be kneaded together in one time or may be sequentially added and kneaded in a step-by-step manner. In the case of sequentially adding the components, the components can be added in any order. The curing agent is preferably added at the end from the viewpoint of preservation stability of the resin composition.

The resin composition may be added with additives such as colorants, flame retarders, flame-retardant assistants, fiber reinforcements, viscosity reducers, dispersion adjusters, and mold release agents if necessary as described above. The order of addition of these additives is not particularly limited. Each additive can be added at any phase, but the curing agent is preferably added at the end as described above.

As a kneading machine device for use in producing the resin composition, those heretofore known in public can be used. Specifically, there can be mentioned a roll mill, a planetary mixer, a kneader, an extruder, a Banbury mixer, a mixing vessel provided with an impeller, a lateral-type mixing tank and the like.

The kneading temperature at manufacturing the resin composition is not particularly limited as long as the resin composition can be kneaded. For example, the kneading temperature is preferably 10 to 150° C. If the kneading temperature is higher than 150° C., curing reaction partially starts, and the resultant resin composition has lower preservation stability in some cases. If the kneading temperature is lower than 10° C., the resultant resin composition has high viscosity and is substantially difficult to knead. The kneading temperature is preferably 20 to 120° C. and more preferably 30 to 100° C.

The uncured resin composition can be molded into any shape by using any method. As the molding means, various means can be used, such as compression molding (direct pressure molding), transfer molding, injection molding, extrusion molding, and screen print, for example.

Through the aforementioned steps, the insulating thermally conductive resin composition 10 is obtained, in which the insulators 2 are dispersed within the matrix resin 1 and are thermally connected by the thermally conductive phase 3.

The insulating thermally conductive resin composition 10 according to the first embodiment includes: the matrix resin 1; and the insulators 2 which are dispersed in the matrix resin 1 and have electrical insulation. The insulating thermally conductive resin composition 10 further includes the thermally conductive phase 3, which has a higher thermal conductivity than the matrix resin 1, thermally connects the insulators 2, and is composed of an organic substance. Within the insulating thermally conductive resin composition 10, therefore, thermal conduction paths composed of the insulators 2 and the thermally conductive phase 3 are formed. Accordingly, the insulating thermally conductive resin composition 10 includes more continuous thermal conduction paths and exerts higher thermal conduction. In the first embodiment, using the organic substance as the thermally conductive phase 3 ensures the electrical insulation between the insulators 2. It is therefore possible to prevent internal short circuit even if the insulating thermally conductive resin composition 10 is used in an electronic component.

[Second Embodiment]

Next, a description is given of an insulating thermally conductive resin composition according to a second embodiment in detail with reference to the drawings. The same components as those of the first embodiment are given the same reference numerals, and the overlapping description is omitted.

An insulating thermally conductive resin composition 10A according to the second embodiment includes a matrix resin and insulators 2 which are dispersed within the matrix resin and have electrical insulation in a similar manner to the first embodiment. The insulating thermally conductive resin composition 10A further includes the thermally conductive phase 3 which has a higher thermal conductivity than the matrix resin, thermally connects the insulators 2, and is composed of an organic sub stance.

Figure 2:
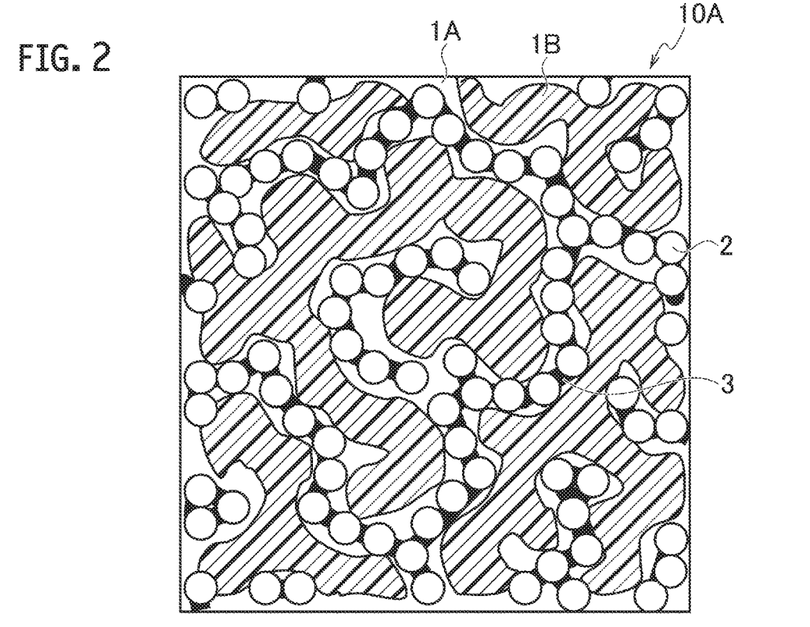
FIG. 2 is a schematic view illustrating an insulating thermally conductive resin composition according to a second embodiment of the present invention.

In the second embodiment, as illustrated in FIG. 2, the matrix resin includes a phase-separated structure which includes a first resin phase 1A and a second resin phase 1B. The first resin phase 1A is composed of a first resin three-dimensionally continuous. The second resin phase 1B is different from the first resin phase 1A and is composed of a second resin. The insulators 2 and thermally conductive phase 3 are unevenly distributed in the first resin phase 1A.

As illustrated in FIG. 2, the insulating thermally conductive resin composition 10A of the second embodiment includes the first and second resin phases 1A and 1B and has a structure in which the first and second resin phases 1A and 1B are mixed and phase-separated. The insulators 2 are unevenly distributed in the first resin phase 1A and are thermally connected to each other through the thermally conductive phase 3. Accordingly, the thermal conduction paths for transferring heat energy formed within the first resin phase 1A improve the thermal conduction of the insulating thermally conductive resin composition 10A. Specifically, since the insulators 2 are unevenly distributed in the first resin phase 1A, the insulators 2 are more likely to come into contact with each other. Moreover, the ratio of the average distance between adjacent insulators 2 to the average particle diameter of the insulators 2 is further reduced. Accordingly, the thermal conduction paths composed of the insulators 2 and thermally conductive phase 3 are more likely to be formed within the insulating thermally conductive resin composition 10A than in the first embodiment not using a phase-separated structure.

In FIG. 2, the insulators 2 are unevenly distributed in the first resin phase 1A. The insulators 2 may be unevenly distributed in the second resin phase 1B. Moreover, it is unnecessary that all the insulators 2 are located within the first resin phase 1A, and some of the insulators 2 may be located in the second resin phase 1B.

Figure 4:
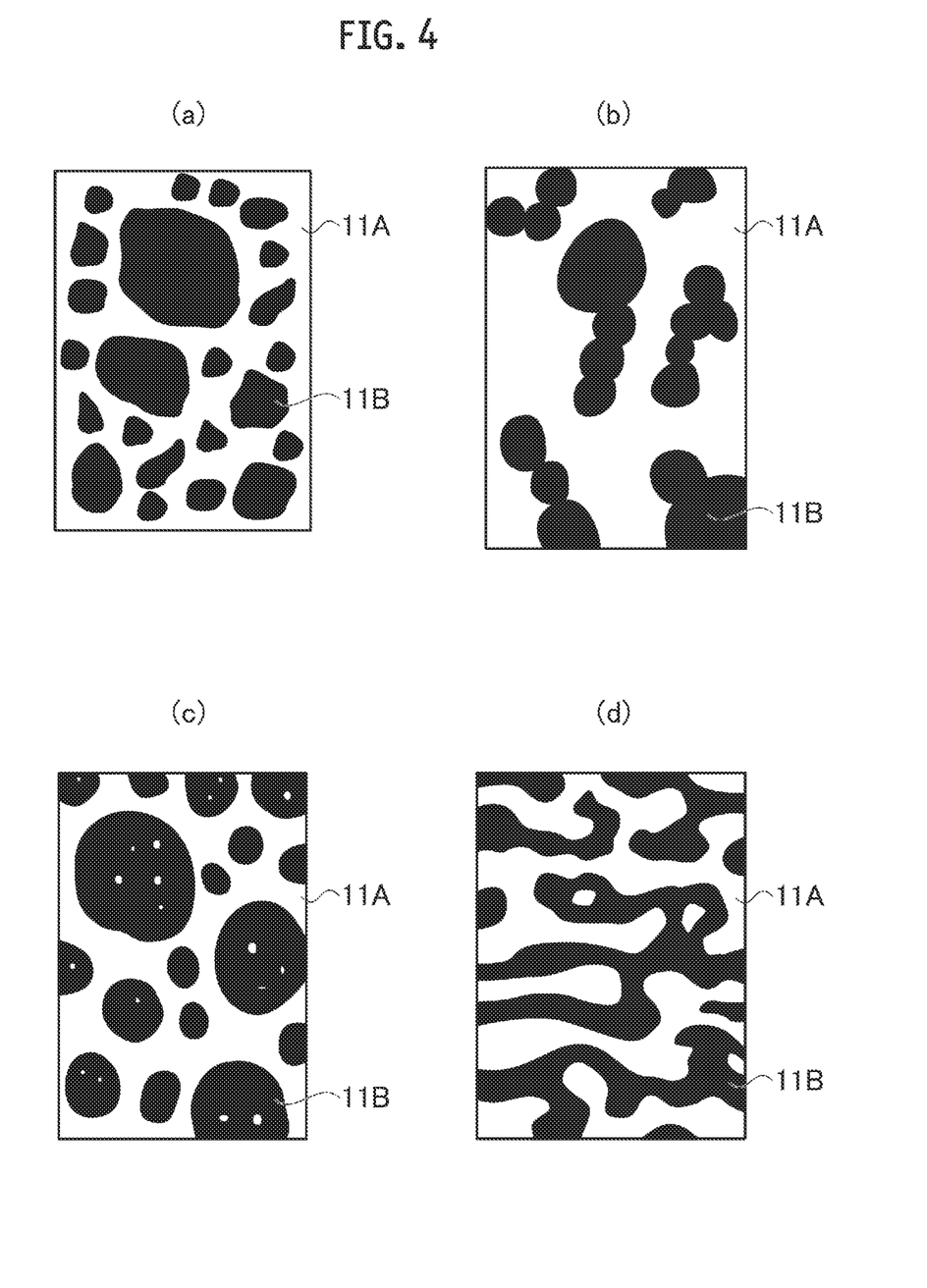
FIGS. 4(a) to 4(d) are schematic views for explaining phase-separated structures, FIG. 4(a) illustrating a sea-island structure, FIG. 4(b) illustrating a continuously spherical structure, FIG. 4(c) illustrating a composite dispersion structure, and FIG. 4(d) illustrating a bicontinuous structure.

The phase-separated structure of the second embodiment is any one of a sea-island structure, a continuously spherical structure, a composite dispersion structure, and a bicontinuous structure. As illustrated in FIG. 4(*a*), the sea-island structure refers to a structure in which a small volume of dispersed phase 11B is dispersed in the continuous phase 11A. In the sea-island structure, the dispersed phase 11B is scattered within the continuous phase 11A in the form of microparticles or spheres. As illustrated in FIG. 4(*b*), the continuously spherical structure is a structure in which substantially spherical particles of dispersed phase 11B are connected and are dispersed in the continuous phase 11A. As illustrated in FIG. 4(c), the composite dispersion structure is a structure in which the dispersed phase 11B is scattered in the continuous phase 11A and resin constituting the continuous phase is scattered in the dispersed phase 11B. As illustrated in FIG. 4(d), the bicontinuous structure is a structure in which the continuous phase 11A and the dispersed phase 11B form a complicated three-dimensional mesh shape.

In the second embodiment, it is necessary that the first resin phase 1A in which the insulators 2 are unevenly distributed are three-dimensionally continuous. The insulators 2 located within the first resin phase 1A form thermal conduction paths. In the sea-island structure, continuously spherical structure, and composite dispersion structure, the continuous phase 11A needs to constitute the first resin phase 1A. In the bicontinuous structure, any one of the continuous phase 11A and dispersed phase 11B needs to constitute the first resin phase 1A since both the continuous phase 11A and dispersed phase 11B are three-dimensionally continuous.

The phase-separated structure, such as the sea-island structure, continuously spherical structure, composite dispersion structure, and bicontinuous structure, can be obtained by controlling curing conditions including the curing rate of the resin composition and reaction temperature, compatibilities of blended resins, and the ratio thereof.

As described above, in the second embodiment, the insulators 2 are unevenly distributed in the first resin phase 1A. The insulators 2 are thereby in contact with each other or are thermally connected through the thermally conductive phase 3 to form thermal conduction paths. Accordingly, the density of the insulators 2 may be either substantially even or uneven in the first resin phase 1A as long as the insulators 2 can form thermal conduction paths.

The insulators 2 may be located in the interface between the first and second resin phases 1A and 1B. Specifically, in the first resin phase 1A, the insulators 2 may be located more in the vicinity of the interface between the first and second resin phases 1A and 1B than in the middle of the first resin phase 1A. In this case, the insulators 2 are preferably located in contact with the interface between the first and second resin phases 1A and 1B. Some of the particles constituting the insulators 2 may be located so as to span the interface between the first and second resin phases 1A and 1B. When the insulators 2 are located in the interface between the first and second resin phases, the insulators 2 are more likely to be thermally connected near the interface within the first resin phase 1A. This allows formation of continuous thermal conduction paths near the interface between the first and second resin phases.

In the second embodiment, preferably, the first resin phase 1A is composed of one of thermosetting resin and thermoplastic resin while the second resin phase 1B is composed of the other one of thermosetting resin and thermoplastic resin. Specifically, when the first resin phase 1A is composed of thermosetting resin, the second resin phase 1B is preferably composed of thermoplastic resin. When the first resin phase 1A is composed of thermoplastic resin, the second resin phase 1B is preferably composed of thermosetting resin. This facilitates formation of the phase-separated structure. The thermosetting resin and thermoplastic resin can be those described in the first embodiment.

The thermosetting resin may be acrylic resin having thermosetting properties. Acrylic resin as thermosetting resin is composed of a (meth)acrylic compound including one (meth)acrylic group or two or more (meth)acrylic groups. The (meth)acrylic compound can be (meth)acrylic acid ester obtained by esterifying an acrylic or methacrylic acid and various alcohol compounds.

Examples of the above (meth)acrylic acid ester are methyl acrylate, ethyl acrylate, propyl acrylate, isobutyl acrylate, t-butyl acrylate, 2-ethylhexyl acrylate, methyl methacrylate, ethyl methacrylate, butyl methacrylate, isobutyl methacrylate, t-butyl methacrylate, propyl methacrylate, and 2-ethylhexyl methacrylate. In the case of using acrylic resin having thermosetting property, the aforementioned curing agent, curing promotors, radical polymerization initiators, and polymerization inhibitors may be used.

The phase-separated structure may be derived by spinodal decomposition in a resin mixture or block copolymer. Preferably, the phase-separated structure is composed of thermosetting resin and thermoplastic resin or elastomer and can be obtained in the following manner, for example.

When the thermosetting resin is epoxy resin, the thermoplastic resin or elastomer can be at least one selected from the group consisting of polyether sulfone, polysulfone, polyphenylene sulfide, polyetherimide, acrylic polymer, acrylic rubber, acrylonitrile butadiene rubber, and modified rubber. Preferably, the thermoplastic resin and elastomer include a functional group that reacts with the thermosetting resin, at the end or in the molecular chain from the viewpoint of controlling the phase-separated structure.

Next, a description is given of a method of manufacturing the insulating thermally conductive resin composition of the second embodiment. First, the insulators and the organic substance constituting the thermally conductive phase 3 are mixed to bring the organic substance into contact with the surfaces of the insulators 2 in a similar manner to the first embodiment.

Next, the thermosetting resin constituting the first resin, the thermoplastic resin constituting the second resin, the insulators 2 provided with the organic substance, and a curing agent are mixed and kneaded, thus preparing an uncured resin composition. The components may be kneaded in one time or may be sequentially added and kneaded in a step-by-step manner. In the case of sequentially adding the components, the component can be added in any order.

In an example of the method of adding and kneading each component, the thermosetting resin is mixed and kneaded with a part or all of the thermoplastic resin for adjustment of the viscosity. Next, the residual thermoplastic resin, the insulators provided with the organic substance, and the curing agent are sequentially added and kneaded. The order of addition is not particularly limited, but the curing agent is preferably added at the end from the viewpoint of preservation stability of the resin composition.

In a similar manner to the first embodiment, the resin composition may be added with additives such as colorants, flame retarders, flame-retardant assistants, fiber reinforcements, viscosity reducers, dispersion adjusters, and mold release agents if necessary. The order of addition of the additives is not particularly limited. Each additive can be added at any phase.

The kneading temperature at manufacturing the resin composition is not particularly limited but is preferably 10 to 150° C., more preferably 20 to 120° C., and especially preferably 30 to 100° C., for example. The uncured resin composition can be molded into any shape by any method similarly to the first embodiment.

Through the aforementioned steps, the insulating thermally conductive resin composition 10A is obtained, in which the insulators 2 are unevenly distributed in the continuous phase of the phase-separated matrix resin and are thermally connected with the thermally conductive phase 3. In the example described in the aforementioned manufacturing method, the first resin is thermosetting resin while the second resin is thermoplastic resin. However, the first resin may be thermoplastic resin while the second resin is thermosetting resin. The first and second resins may be both thermosetting resin or may be both thermoplastic resin.

The insulating thermally conductive resin composition 10A according to the second embodiment includes the matrix resin having a phase-separated structure that includes: the first resin phase 1A in which the first resin continues three-dimensionally; and the second resin phase 1B different from the first resin phase 1A and formed of the second resin. The insulating thermally conductive resin composition 10A further includes: the insulators 2 which have electrical insulation, and further includes the thermally conductive phase 3 which has a higher thermal conductivity than the matrix resin, thermally connects the insulators 2, and is composed of the organic substance. The insulator 2 and the thermally conductive phase 3 are unevenly distributed in the first resin phase 1A.

In the aforementioned configuration, the ratio of the average distance between adjacent insulators 2 to the average particle diameter of the insulators 2 is further reduced. Moreover, the insulators 2 are more likely to come into contact with each other since the insulators 2 are unevenly distributed in the first resin phase 1A. Thermal conductive paths composed of the insulators 2 and the thermally conductive phase 3 are therefore more likely to be formed within the insulating thermally conductive resin composition 10A, than in the first embodiment not using a phase-separated structure. The insulating thermally conductive resin composition 10A has a higher thermal conduction than the insulating thermally conductive resin composition 10 of the first embodiment. In the second embodiment, using the organic substance as the thermally conductive phase 3 ensures electrical insulation between the insulators 2. It is therefore possible to prevent internal short circuit even when the insulating thermally conductive resin composition 10A is used as an electronic component.

[Third Embodiment]

Next, a description is given of an insulating thermally conductive resin composition according to a third embodiment in detail with reference to the drawings. The same components as those of the first and second embodiments are given the same reference numerals, and the overlapping description is omitted.

Figure 3:
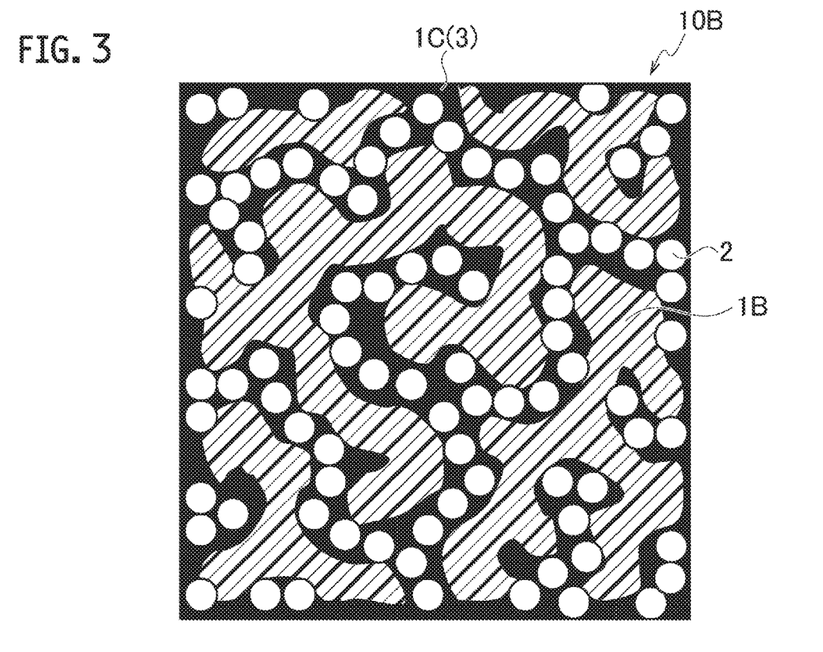
FIG. 3 is a schematic view illustrating an insulating thermally conductive resin composition according to a third embodiment of the present invention.

An insulating thermally conductive resin composition 10B according to the third embodiment includes: a matrix resin; and insulators 2, which are dispersed within the matrix resin and have electrical insulation in a similar manner to the first and second embodiments. The insulating thermally conductive resin composition 10B further includes thermally conductive phase 3 which has a higher thermal conductivity than the matrix resin, thermally connects the insulators 2, and is composed of an organic substance. The matrix resin has a phase-separated structure that includes: a first resin phase 1C composed of first resin three-dimensionally continuous; and a second resin phase 1B which is different from the first resin phase 1C and is composed of second resin. The insulators 2 and the thermally conductive phase 3 are unevenly distributed in the first resin phase 1C.

In the insulating thermally conductive resin composition 10B of the third embodiment, the first resin phase 1C serves as the thermally conductive phase 3. To be specific, in the insulating thermally conductive resin composition 10A of the second embodiment, the thermally conductive phase 3 is located within the first resin phase 1A, and the resin constituting the first resin phase 1A is a compound different from the organic substance constituting the thermally conductive phase 3. In the insulating thermally conductive resin composition 10B of the third embodiment, the resin constituting the first resin phase 1C is the same compound as the organic substance constituting the thermally conductive phase 3. The first resin phase 1A is composed of the same organic substance as that of the thermally conductive phase 3, and the first resin phase 1A exerts the same function as the thermally conductive phase 3.

As illustrated in FIG. 3, the insulating thermally conductive resin composition 10B of the third embodiment includes the first resin phase 1C and the second resin phase 1B and has a structure in which the first resin phase 1C and the second resin phase 1B are mixed and phase-separated. The insulators 2 are unevenly distributed in the first resin phase 1C and are thermally connected through the thermally conductive phase 3. However, the first resin phase 1C is composed of the same compound as the thermally conductive phase 3 and serves as the thermally conductive phase 3 in the third embodiment. The first resin phase 1C forms thermal conduction paths to transfer heat energy, which further improves the thermal conduction of the insulating thermally conductive resin composition 10B. The proportion of the thermally conductive phase 3 in the insulating thermally conductive resin composition 10B is higher than that in the insulating thermally conductive resin composition 10A of the second embodiment. The insulating thermally conductive resin composition 10B therefore has further improved thermal conduction compared with the insulating thermally conductive resin composition 10A.

The insulating thermally conductive resin composition 10B of the third embodiment has a phase-separated structure similarly to the second embodiment. The insulators 2 are unevenly distributed in the first resin phase 1C and are more likely to come into contact with each other. Moreover, the ratio of the average distance between adjacent insulators 2 to the average particle diameter of the insulators 2 is further reduced. Accordingly, thermal conduction paths composed of the insulators 2 and the thermally conductive phase 3 (the first resin phase 1C) are more likely to be formed within the insulating thermally conductive resin composition 10B, than in the first embodiment not using a phase-separated structure.

In FIG. 3, similarly to the second embodiment, it is unnecessary that all the insulators 2 are located within the first resin phase 1C, and some of the insulators 2 may be located in the second resin phase 1B. Similarly to the second embodiment, moreover, the first resin phase 1C, in which the insulators 2 are unevenly distributed, needs to be three-dimensionally continuous. In the sea-island structure, continuously spherical structure, and composite dispersion structure, the continuous phase 11A needs to constitute the first resin phase 1C. In the bicontinuous structure, any one of the continuous phase 11A and the dispersed phase 11B needs to constitute the first resin phase 1C since both the continuous phase 11A and the dispersed phase 11B are three-dimensionally continuous.

Similarly to the second embodiment, the density of the insulators 2 may be either substantially even or uneven in the first resin phase 1C as long as the insulators 2 can form thermal conduction paths. The insulators 2 may be located in the interface between the first resin phase 1C and the second resin phase 1B. Some of the particles constituting the insulator 2 may be located so as to span the interface between the first resin phase 1C and the second resin phase 1B.

Similarly to the second embodiment, preferably, the first resin phase 1C is composed of one of thermosetting resin and thermoplastic resin while the second resin phase 1B is composed of the other one of thermosetting resin and thermoplastic resin. The thermosetting resin and the thermoplastic resin can be those described in the first and second embodiments. The first resin constituting the first resin phase 1C is preferably composed of the organic substance constituting the thermally conductive phase 3 described in the first embodiment.

Next, a description is given of a method of manufacturing the insulating thermally conductive resin composition of the third embodiment. The thermosetting resin with high thermal conduction constituting the first resin, the thermoplastic resin constituting the second resin, the insulators, and a curing agent are mixed and kneaded, thus preparing an uncured resin composition. The components may be kneaded in one time or may be sequentially added and kneaded in a step-by-step manner. In the case of sequentially adding each component, the components can be added in any order.

In an example of the method to add and knead each component, similarly to the second embodiment, the thermosetting resin is mixed and kneaded with a part or all of the thermoplastic resin for adjustment of the viscosity. Next, the residual thermoplastic resin, insulator, and curing agent are sequentially added and kneaded.

In a similar manner to the second embodiment, the resin composition may be added with additives such as colorants, flame retarders, flame-retardant assistants, fiber reinforcements, viscosity reducers, dispersion adjusters, and mold release agents if necessary. The order of addition of the additives is not particularly limited. Each additive can be added at any phase.

The kneading temperature at manufacturing the resin composition is not particularly limited but is preferably 10 to 150° C., more preferably 20 to 120° C., and especially preferably 30 to 100° C., for example. The uncured resin composition can be molded into any shape by any method in a similar manner to the second embodiment.

Through the aforementioned steps, the insulating thermally conductive resin composition 10B is obtained, in which the insulators 2 are unevenly distributed in the continuous phase of the phase-separated matrix resin and the continuous phase is the thermally conductive phase 3. In the example described in the above manufacturing method, the first resin is thermosetting resin with high thermal conduction while the second resin is thermoplastic resin. However, the first resin may be thermoplastic resin with high thermal conduction while the second resin is thermosetting resin. The first and second resins may be both thermosetting resin or may be both thermoplastic resin.

The insulating thermally conductive resin composition 10B according to the third embodiment includes the matrix resin having a phase-separated structure that includes: the first resin phase 1C in which the first resin continues three-dimensionally; and the second resin phase 1B different from the first resin phase 1C and formed of the second resin. The insulating thermally conductive resin composition 10B further includes the insulators 2 which have electrical insulation, and further includes the thermally conductive phase 3 which has a higher thermal conductivity than the matrix resin, thermally connects the insulators 2, and is composed of the organic substance. The insulator 2 is unevenly distributed in the first resin phase 1A. The first resin phase 1C serves as the thermally conductive phase 3.

In the aforementioned configuration, the ratio of the average distance between adjacent insulators 2 to the average particle diameter of the insulators 2 is reduced in the first resin phase 1C. Moreover, the insulators 2 are more likely to come into contact with each other since the insulators 2 are unevenly distributed in the first resin phase 1C. Accordingly, thermal conduction paths composed of the insulators 2 and the thermally conductive phase 3 are more likely to be formed within the insulating thermally conductive resin composition 10B, than in the first embodiment not using a phase-separated structure. The insulating thermally conductive resin composition 10B therefore has improved thermal conduction compared with the insulating thermally conductive resin composition 10 of the first embodiment. Moreover, the third embodiment have a higher thermal conduction than the second embodiment since the first resin phase 1C serves as the thermally conductive phase 3. Using an organic substance as the thermally conductive phase 3 ensures electrical insulation between the insulators 2. It is therefore possible to prevent internal short circuit even when the insulating thermally conductive resin composition 10B is used as an electronic component.

EXAMPLES

Hereinafter, a description is given of the first to third embodiments in more detail using Examples and Comparative Examples. The first to third embodiments are not limited to Examples.

Resin compositions of Examples and Comparative Examples were prepared using the following resins, curing agents, and curing promotors, and insulators.

[Thermosetting Resin]
(1) Epoxy resin A (epoxy equivalent: 370 g/eq, thermal conductivity: 0.3 W/(m·K))
(2) Epoxy resin B (jER (registered trademark) 828 made by Mitsubishi Chemical Corporation, epoxy equivalent: 189 g/eq, thermal conductivity: 0.2 W/(m·K))

[Thermoplastic Resin]
(1) Liquid crystal polyester expressed by Chemical Formula 3 (thermal conductivity: 0.5 W/(m·K), number average molecular weight Mn: $2.4 \times 10^4$, dispersion ratio (Mw/Mn): 2.4)

[Chem. 3]

(2) Polyether sulfone (SUMIKAEXCEL (registered trademark) 5003P made by Sumitomo Chemical Co., Ltd., thermal conductivity: 0.2 W/(m·K))

[Curing Agent]
(1) Novolac phenol resin (PHENOLITE (registered trademark) TD-2131 made by DIC Corporation, hydroxyl group equivalent: 104 g/eq)
(2) 4,4'-methylenedianiline (made by Wako Pure Chemical Industries, active hydrogen equivalent: 49.5 g/eq)

[Curing Promotor]
Triphenylphosphine (made by Tokyo Chemical Industry Co., Ltd.)

[Insulator]
(1) Insulator A: MgO, average particle diameter ($d_{50}$): 8.0 μm
(2) Insulator B: $Al_2O_3$, average particle diameter ($d_{50}$): 1.2 μm Example 1

First, epoxy resin A was added with polyether sulfone to be dissolved, thus preparing a resin mixture. The blending amounts thereof were shown in Table 1. Next, the resin mixture was added to the novolac phenol resin and triphenylphosphine. To the resin mixture, insulator A was then mixed to a volume proportion of 30% by volume, thus preparing a compound.

The compound was put into a mold heated to 150° C. and was kept at 150° C. in a drying oven for one hour. The compound was then further heated at 180° C. for five hours, thus preparing a resin plate of Example 1. The resin plate of Example 1 has the structure illustrated in FIG. 3.

Example 2

First, liquid crystal polyester was dissolved in p-chlorophenol/toluene solvent mixture (the mixed ratio (mass ratio): 3/8), and insulator B was added thereto, thus preparing slurry dispersion liquid. The slurry dispersion liquid was then dried, thus preparing liquid crystal polyester-processed insulator B.

Next, epoxy resin B was added with polyether sulfone to be dissolved, thus preparing a resin mixture. The blending amounts thereof were shown in Table 1. Next, the resin mixture was added with 4,4'-methylenedianiline. To the resultant resin mixture, the aforementioned liquid-crystal polyester-processed insulator B was mixed to a volume proportion of 15% by volume, thus preparing a compound.

The compound was put into a mold heated to 150° C. and was kept at 150° C. in a drying oven for two hours. The compound was then further heated at 180° C. for two hours, thus preparing a resin plate of Example 2. The resin plate of Example 2 has the structure illustrated in FIG. 2.

Comparative Example 1

First, the epoxy resin B was added with polyether sulfone to be dissolved, thus producing a resin mixture. The blending amounts thereof were shown in Table 1. The resin mixture was added with 4,4'-methylenedianiline. To the resultant resin mixture, the insulator A was added to a volume proportion of 30% by volume, thus producing a compound.

The compound was put into a mold heated to 150° C. and was kept at 150° C. in a drying oven for two hours. The compound was further heated at 180° C. for two hours, thus preparing a resin plate of Comparative Example 1.

Comparative Example 2

First, epoxy resin B was added with polyether sulfone to be dissolved, thus producing a resin mixture. The blending amounts thereof were shown in Table 1. The resin mixture was added with 4,4'-methylenedianiline. To the resultant resin mixture, the insulator B was mixed to a volume proportion of 15% by volume, thus producing a compound.

The compound was put into a mold heated to 150° C. and was kept at 150° C. in a drying oven for two hours. The compound was further heated at 180° C. for two hours, thus preparing a resin plate of Comparative Example 2.

The volume proportion of the insulators, the inter-insulator distance, and thermal conductivity of each test piece of Examples and Comparative Examples were measured and evaluated by the following methods. The results of measurements and evaluations were shown in Table 1 together.

[Volume Proportion of Insulator]

First, the volume of the test piece of each example was calculated by Archimedean method. Next, each test piece was baked at 625° C. using a muffle furnace for measurement of the weight of an ash. The ash is the insulators, and the volume proportion of the insulators in each test piece was calculated based on the ash weight, the density, and the volume of the test piece. The densities of MgO and $Al_2O_3$ were 3.65 and 3.9 $g/cm^3$, respectively.

[Inter-insulator Distance]

A cross-section of each test piece was prepared using a cross section polisher (registered trademark, SM-09010 made by JEOL Ltd.). The cross-section of each test piece was observed with a scanning electron microscope (JSM-7000F made by JEOL Ltd.) One hundred insulator particles were randomly chosen from each cross-section SEM observation image, and the distance between each of the chosen particles and a particle adjacent thereto was measured. The average of the measured 100 inter-particle distances was referred to as the inter-insulator distance.

[Thermal Conductivity]

The thermal conductivity was calculated as a product of the thermal diffusivity, specific heat, and density. The thermal diffusivity was measured by a xenon flash method using an Xe flash analyzer LFA447 Nanoflash (made by NETZSCH), and the density was measured by Archimedean method (water displacement method). The specific heat was measured by DSC method using DSC6220 made by Seiko Instruments Inc.

TABLE 1

| | | | Example 1 | Example 2 | Comparative Example 1 | Comparative Example 2 |
|---|---|---|---|---|---|---|
| Blending Amount (Parts by mass) | Thermosetting Resin | Epoxy Resin A | 100 | 0 | 0 | 0 |
| | | Epoxy Resin B (jER828) | 0 | 100 | 100 | 100 |
| | Thermoplastic Resin | SUMIKAEXCEL 5003P | 22.3 | 22.3 | 22.3 | 22.3 |
| | Curing Agent | TD-2131 | 28 | 0 | 0 | 0 |
| | | 4,4'-methylenedianiline | 0 | 26 | 26 | 26 |
| | Curing Promotor | Triphenylphosphine | 1 | 0 | 0 | 0 |
| | Insulator | Insulator A MgO, $d_{50}$: 8 μm | 200 | 0 | 200 | 0 |

TABLE 1-continued

|  | Example 1 | Example 2 | Comparative Example 1 | Comparative Example 2 |
|---|---|---|---|---|
| Liquid Crystal Polyester-Processed Insulator B $Al_2O_3$, $d_{50}$: 1.2 μm | 0 | 85 | 0 | 0 |
| Insulator B $Al_2O_3$, $d_{50}$: 1.2 μm | 0 | 0 | 0 | 85 |
| Volume Proportion of Insulator (% by volume) | 30 | 15 | 30 | 15 |
| Inter-insulator Distance(μm) | 0.8 | 0.1 | 0.8 | 0.1 |
| Thermal Conductivity of Resin Composition (W/mK) | 1.1 | 0.6 | 0.7 | 0.3 |

As shown in Table 1, Examples 1 and 2 had higher thermal conductivities than those of Comparative Examples 1 and 2, respectively, although Example 1 and Comparative Example 1 had the same volume proportion of the insulators and Example 2 and Comparative Example 2 had the same volume proportion of the insulators.

The reason for which Example 1 had a higher thermal conductivity than Comparative Example 1 is considered as follows. The insulators of Example 1 and Comparative Example 1 are both unevenly distributed in the epoxy-rich phase, and the inter-insulator distances thereof are substantially the same. Accordingly, the difference in thermal conductivity between Example 1 and Comparative Example 1 is related to the thermal conductivities of the epoxy phases. As for the thermal conductivities of the resin plates formed by curing only epoxy resin, the resin plate of epoxy resin A has a thermal conductivity of 0.3 W/(m·K) while the resin plate of epoxy resin B has a thermal conductivity of 0.2 W/(m·K). Accordingly, Example 1 had a higher thermal conductivity.

The reason for which Example 2 has a higher thermal conductivity than Comparative Example 2 is considered as follows. The insulators of Example 2 and Comparative Example 2 are both unevenly distributed in the epoxy-rich phase, and the inter-insulator distances thereof are substantially the same. Accordingly, the difference in thermal conductivity between Example 2 and Comparative Example 2 is related to the thermal conductivities of the thermally conductive phases between the insulators. The insulators are connected through liquid crystal polyester (0.5 W/(m·K)) in Example 2 while the insulators are connected through epoxy resin B (0.2 W/(m·K)) in Comparative Example 2. Accordingly, Example 2 had a higher thermal conductivity.

The entire content of Japanese Patent Application No. 2013-101032 (filed on May 15, 2014) is herein incorporated by reference.

Although the present invention has been described above by reference to the embodiments and the example, the present invention is not limited to those, and it will be apparent to these skilled in the art that various modifications and improvements can be made.

INDUSTRIAL APPLICABILITY

The insulating thermally conductive resin composition of the present embodiment includes a thermally conductive phase that thermally connects insulators dispersed in the matrix resin, thus providing high thermal conduction. The insulators have electrical insulation properties, and the thermally conductive phase is composed of an organic substance. The resultant insulating thermally conductive resin composition has high electrical insulation.

REFERENCE SIGNS LIST

1 MATRIX RESIN
1A, 1C FIRST RESIN PHASE
1B SECOND RESIN PHASE
2 INSULATOR
3 THERMAL CONDUCTIVE PHASE
10, 10A, 10B INSULATING THERMALLY CONDUCTIVE RESIN COMPOSITION

The invention claimed is:

1. An insulating thermally conductive resin composition, comprising:
a matrix resin;
insulators which are dispersed in the matrix resin and have electrical insulation; and
a thermally conductive phase which has a higher thermal conductivity than the matrix resin, thermally connects the insulators, and is composed of an organic substance,
wherein the organic substance constituting the thermally conductive phase has a thermal conductivity of not less than 0.3 W/(m·K),
wherein the matrix resin has a phase-separated structure including: a first resin phase in which a first resin continues three-dimensionally; and a second resin phase different from the first resin phase and formed of a second resin, and the first resin phase is composed of one of a thermosetting resin and a thermoplastic resin while the second resin phase is composed of an other one of the thermosetting resin and the thermoplastic resin, and
wherein the insulators and the thermally conductive phase are unevenly distributed in the first resin phase.

2. The insulating thermally conductive resin composition according to claim 1, wherein the average distance between adjacent ones of the insulators in the matrix resin is smaller than the average particle diameter of the insulators.

3. The insulating thermally conductive resin composition according to claim 1, wherein the insulators are spherical.

4. The insulating thermally conductive resin composition according to claim 1, wherein the average particle diameter of the insulators is 0.5 to 50 μm, and the proportion of the insulators in the insulating thermally conductive resin composition is 10 to 80% by volume.

5. The insulating thermally conductive resin composition according to claim 1, wherein the insulators contain at least one selected from the group consisting of MgO, $Al_2O_3$, BN, and AlN.

6. The insulating thermally conductive resin composition according to claim 1, wherein the thermally conductive phase is the first resin phase.

* * * * *